(12) United States Patent
Schmidt et al.

(10) Patent No.: US 6,202,019 B1
(45) Date of Patent: Mar. 13, 2001

(54) METHOD OF IMPROVING ABS CONTROL BEHAVIOR

(75) Inventors: Holger Schmidt, Wettenberg; Ivica Batistic, Frankfurt am Main, both of (DE)

(73) Assignee: Continental Teves AG & Co. OHG (DE)

( * ) Notice: Subject to any disclaimer, the term of this patent is extended or adjusted under 35 U.S.C. 154(b) by 0 days.

(21) Appl. No.: 09/214,955

(22) PCT Filed: Jun. 25, 1997

(86) PCT No.: PCT/EP97/03336

§ 371 Date: May 5, 1999

§ 102(e) Date: May 5, 1999

(87) PCT Pub. No.: WO98/03383

PCT Pub. Date: Jan. 29, 1998

(30) Foreign Application Priority Data

Jul. 18, 1996 (DE) ................................................ 196 28 971

(51) Int. Cl.[7] ........................... G06F 7/00; G06F 17/00
(52) U.S. Cl. ............................ 701/72; 701/70; 701/71; 701/74; 303/122.06; 303/182; 303/189; 180/197
(58) Field of Search ........................... 701/70, 71, 72, 701/74, 75, 78, 79; 180/197; 303/156, 158, 182, 196, 189, 167, 122.06

(56) References Cited

U.S. PATENT DOCUMENTS 3,829,168 * 8/1974 Schnaibel et al. ............... 303/21 BE
5,109,339 * 4/1992 Watanabe et al. .
5,579,230 * 11/1996 Lin et al. .

FOREIGN PATENT DOCUMENTS

| 44 18 772 | of 0000 | (DE) . |
| 37 26 998 | 2/1989 | (DE) . |
| 39 05 045 | 8/1990 | (DE) . |
| 42 34 819 | 4/1993 | (DE) . |
| 42 28 893 | 3/1994 | (DE) . |
| 42 29 504 | 3/1994 | (DE) . |
| 44 30 458 | 2/1996 | (DE) . |
| 295 561 | 12/1988 | (EP) . |
| 2 662 982 | 12/1991 | (FR) . |
| WO90/09301 | 8/1990 | (WO) . |

* cited by examiner

Primary Examiner—William A. Cuchlinski, Jr.
Assistant Examiner—Gertrude Arthur
(74) Attorney, Agent, or Firm—Rader, Fishman & Grauer PL

(57) ABSTRACT

In a method of improving the control behavior of an anti-lock control system, criteria for identifying a cornering situation and the direction of curve are obtained from the rotating behavior of the vehicle wheels. For cornering identification, the wheel slip values ($\lambda_i$) are filtered by way of a first order, low pass and the filtered values are compared. The time constant (T) of the low pass filter is varied as a function of the acceleration ($a_i$) of the respective wheel (i). The time constant ($T_i$) of the filter starting from a minimum value ($T_{min}$), is increased according to the relation $$T_i = T_{min} + (a_{grenz} - a_i)/k_1$$

as soon as the acceleration ($a_i$) of the respective wheel (i) drops below a predetermined limit value ($a_{grenz}$).

4 Claims, 2 Drawing Sheets

METHOD OF IMPROVING ABS CONTROL BEHAVIOR

BACKGROUND OF THE INVENTION

The present invention relates to a method of improving the control behavior of an anti-lock control system, wherein a vehicle reference speed that is used as a reference quantity to determine the wheel slip of the individual wheels is derived from the rotating behavior of the vehicle wheels, and criteria are obtained for identifying a cornering situation and the curve direction, wherein for identifying cornering the wheel slip values are filtered by way of a low-pass filter and the filtered values are compared.

It is already known in the art to extend the functions of an anti-lock control system by employing the system for improving the driving stability or deceleration stability in the curve. For this purpose, during cornering or during a partial deceleration, i.e., in a deceleration process in which the threshold of response to the anti-lock control system is not achieved, a stabilizing moment about the vertical axis of the vehicle is created by specifically delaying the brake pressure build-up on the wheels at the inner side of the curve compared to the brake pressure on the wheels on the outer side of the curve ('Bremsanlage und Schlupf-Regelsystem der neuen 7-er Reihe von BMW' (Brake System and Slip Control System of the new BMW No. 7 series); ATZ 97 (1995), pp. 8–15, and 'Bremsanlage und Schlupf-Regelsysteme der neuen Baureihe 5 von BMW' (Brake System and Slip Control Systems of the new BMW No. 5 series); ATZ 98 (1996), pp. 188–194. The information on the actual steering angle is derived—if no steering angle sensor is used—from the transverse acceleration which, in turn, is calculated from the wheel sensor signals.

DE 34 13 738 C2 discloses an anti-lock control system (ABS) provided with a system for identifying a cornering situation based on wheel slip measurement. To identify a cornering situation, the sum of slip values on the wheels at one vehicle side are summed up and compared to the slip values on the wheels at the other vehicle side, generating a cornering identification signal as soon as the difference of the summed-up slip values exceeds a predetermined limit value. Upon identification of a cornering situation, selective criteria, such as 'select-low' or 'select high' according to which the pressure variation in the individual brake pressure control channels of the said brake system is controlled, and limit values for rendering the said selective criteria effective, are varied. In this way, the control will be adjusted to the varying conditions during straight-forward driving and during cornering.

DE 21 19 590 A1 which has an older filing date teaches generating a cornering identification signal with the aid of a transverse acceleration meter, such as a mercury switch.

The calculation of the filtered wheel slip and the evaluation of this quantity to determine criteria for cornering are described in the patent application DE 195 22 634 A1 which is not prior published. The filtered wheel slip values are compared and evaluated for cornering identification according to the above publications. Cornering is identified when simultaneously the values of the filtered wheel slip on both front wheels exceed a predetermined maximum slip value and the filtered wheel slip of a rear wheel is in excess of an equally predetermined maximum slip value and the filtered wheel slip of the second rear wheel is below a determined minimum slip value.

When cornering is identified, switch-over to a special, i.e., cornering, control mode is effected according to patent application DE 195 22 632 A1 which is also not prior published.

An object of the present invention is to improve, in a method of the type referred to hereinabove, the ability of evaluating the measuring signals and, more particularly, the reliable identification of a cornering situation compared to straight travel.

SUMMARY OF THE INVENTION

It has been found that this object may be achieved by a method the special feature of which includes that a filter of first order is used as a low-pass filter to process the wheel slip values, the time constant of which filter is varied as a function of the acceleration of the respective wheel. Advantageously, the time constant $T_i$ of the filter, starting from a minimum value $T_{min}$, is increased according to the relation $$T_i = T_{min} + (a_{grenz} - a_i)/k_1 \text{ with } i=1\ldots 4$$

as soon as the acceleration ai of the respective wheel i drops below a predetermined limit value (in other words: exceeds a deceleration limit value).

The filtered wheel slip is a key signal of a control of this type. The safety of identifying the slip condition is greatly improved by increasing the time constant at greater wheel decelerations, i.e., at wheel accelerations below the predetermined limit value. The minimum value of the filter time constant is decisive at greater wheel accelerations.

In another preferred embodiment of the present invention, when programmed circuits are used, the filtered wheel slip values $fws_i$ are produced for each individual wheel according to the relation $$fws_{i_{neu}} = fws_{i_{alt}} + (v_{REF} - v_i - fws_{i_{alt}})/T_i$$

wherein '$fws_{neu}$' refers to the wheel slip value which was last determined in the working cycle, '$fws_{alt}$' refers to the filtered wheel slip value which was previously determined in the working cycle, '$v_{REF}$' refers to a vehicle reference speed, and '$v_i$' refers to the wheel speed and '$T_i$' to the variable time constant.

Further features, advantages and possible applications of the present invention can be taken from the following description making reference to the accompanying drawings.

DETAILED DESCRIPTION OF THE DRAWINGS

Both the block diagram and the flow chart are schematically simplified to illustrate the main features of the present invention.

Figure 1:
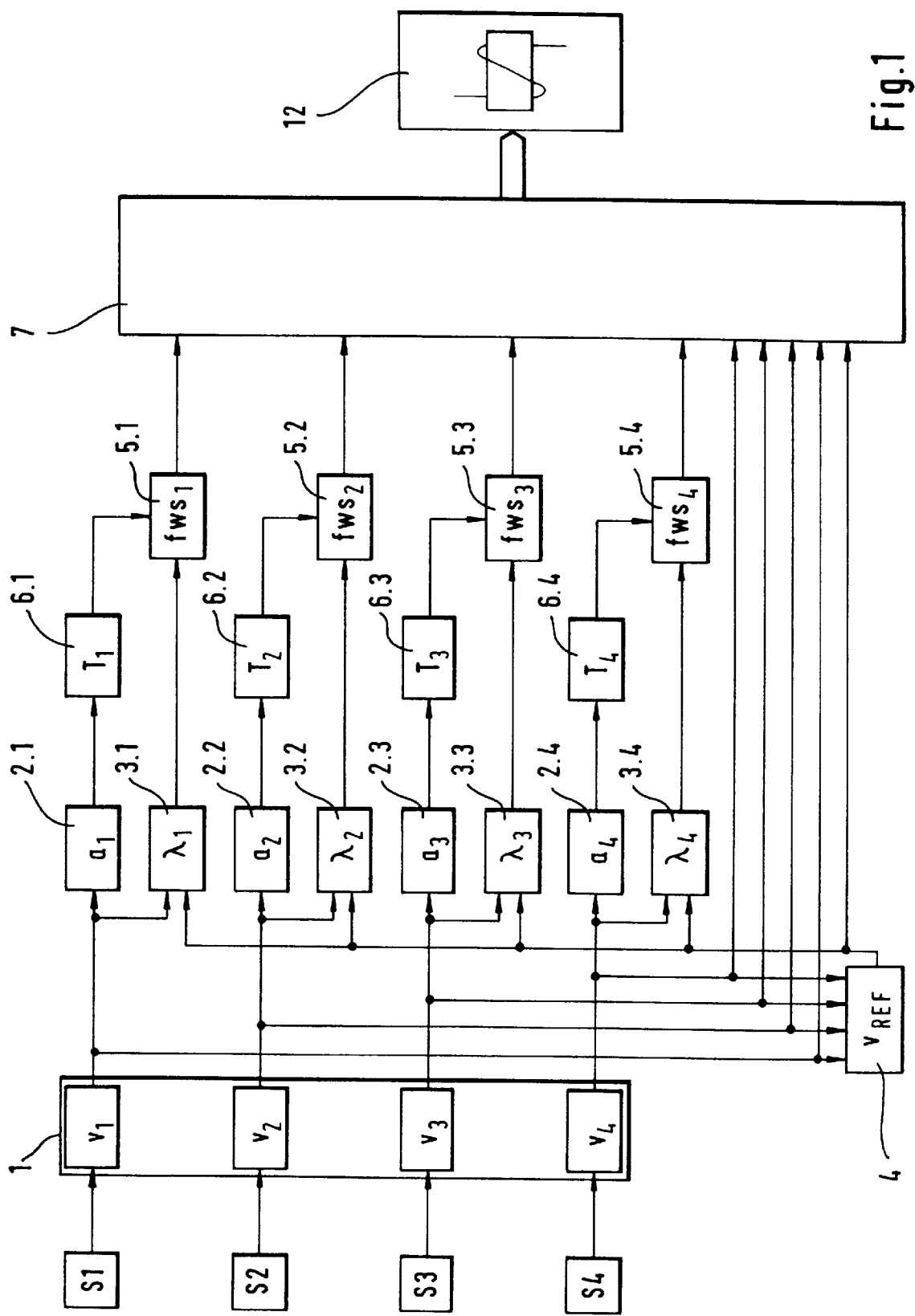
FIG. 1 is a view of the basic electronic components or function blocks of a circuit configuration for implementing the method of the present invention.

According to FIG. 1, the rotating behavior of the individual vehicle wheels is determined by way of wheel sensors S1 to S4. Wheel speed signals $v_1$ to $v_4$ or corresponding information available as data and appropriate for further processing in the system shown are produced from the sensor signals in an evaluating circuit 1. The illustrated arrangement may be a hard-wired electronic logic circuit or may represent the logic linkings and the operation of a microcomputer program. Up-to-date anti-lock systems are mainly based on data processing by means of microprocessors and microcomputers.

From the speed signals or data $v_1$ to $v_4$ of the individual wheels, corresponding wheel acceleration signals $a_1$ to $a_4$ are produced in circuits 2 (2.1 to 2.4), and wheel slip signals $\lambda_1$ to $\lambda_4$ are produced in the circuit sections or circuit blocks 3 (3.1 to 3.4). The respective wheel speed $v_i$ is compared to a vehicle reference speed $v_{REF}$ which is produced in a circuit block 4 to calculate the wheel slip $\lambda_i$.

The wheel slip signal $\lambda_i$ passes a low-pass filter 5 (5.1 to 5.4) at the output of which the filtered slip value $fws_i$ or $fws_1$ to $fws_4$ is available. According to the present invention, low-pass filters of first order are used to calculate the filtered slip value according to the relation $$fws_i = \lambda_i (1 - e^{-t/T}).$$

According to the present invention, the filter time constant $T_i$ is varied as a control quantity as a function of the acceleration $a_i$ of the respective wheel i pursuant the relation $$T_i = T_{min} + (a_{grenz} - a_i)/k_1 \text{ with } i=1 \ldots 4$$

When the expression '$a_{grenz} - a_i$' adopts negative values, the minimum value '$T_{min}$' of the filter time constant will apply.
A value of $$a_{grenz} = -2g,$$

for example, has proved appropriate as an acceleration limit value. In general, a range of $$4g < a_{grenz} < -1g$$

is deemed appropriate for this limit value $a_{grenz}$.
A typical value for the minimum value of the time constant $T_{min}$ ranges at $$T_{min} = 70 \text{ msec;}$$

however, any other value in the range of $$50 \text{ msec} < T_{min} < 100 \text{ msec}$$

may also be chosen. The suitable quantities for $a_{grenz}$ and $T_{min}$ may also be determined empirically. The conversion constant $k_1$ could e.g. adopt a value of approximately $$k_1 = 300 \text{ m/s3}$$

in the above-mentioned 'typical' example. With $T_{min}=70$ msec, $a_{grenz}=-2g$ and $a_i=-7g$, a time constant of 230–240 msec approximately would result in this case, i.e., a generally useful value.

According to FIG. 1, the variable time constant $T_i$ which is responsive to the respective wheel acceleration $a_i$ is produced in a circuit section 6 (6.1 to 6.4). The output signals of the circuit section 6 and the circuit block 3, which latter determines the actual slip value, are the input signals for the low-pass filter 5 (5.1 to 5.4).

Finally, an ABS logic 7 is represented in the circuit configuration of FIG. 1. Brake pressure control signals are determined in logic 7 on the basis of the filtered slip values $fws_i$, the wheel speed values $v_i$ and the reference speed $v_{REF}$ according to complex algorithms. Brake pressure actuators 12, for example hydraulic valves, are actuated by the output signals of the ABS logic 7 and set and modulate the brake pressure in the individual wheel brakes.

Figure 2:
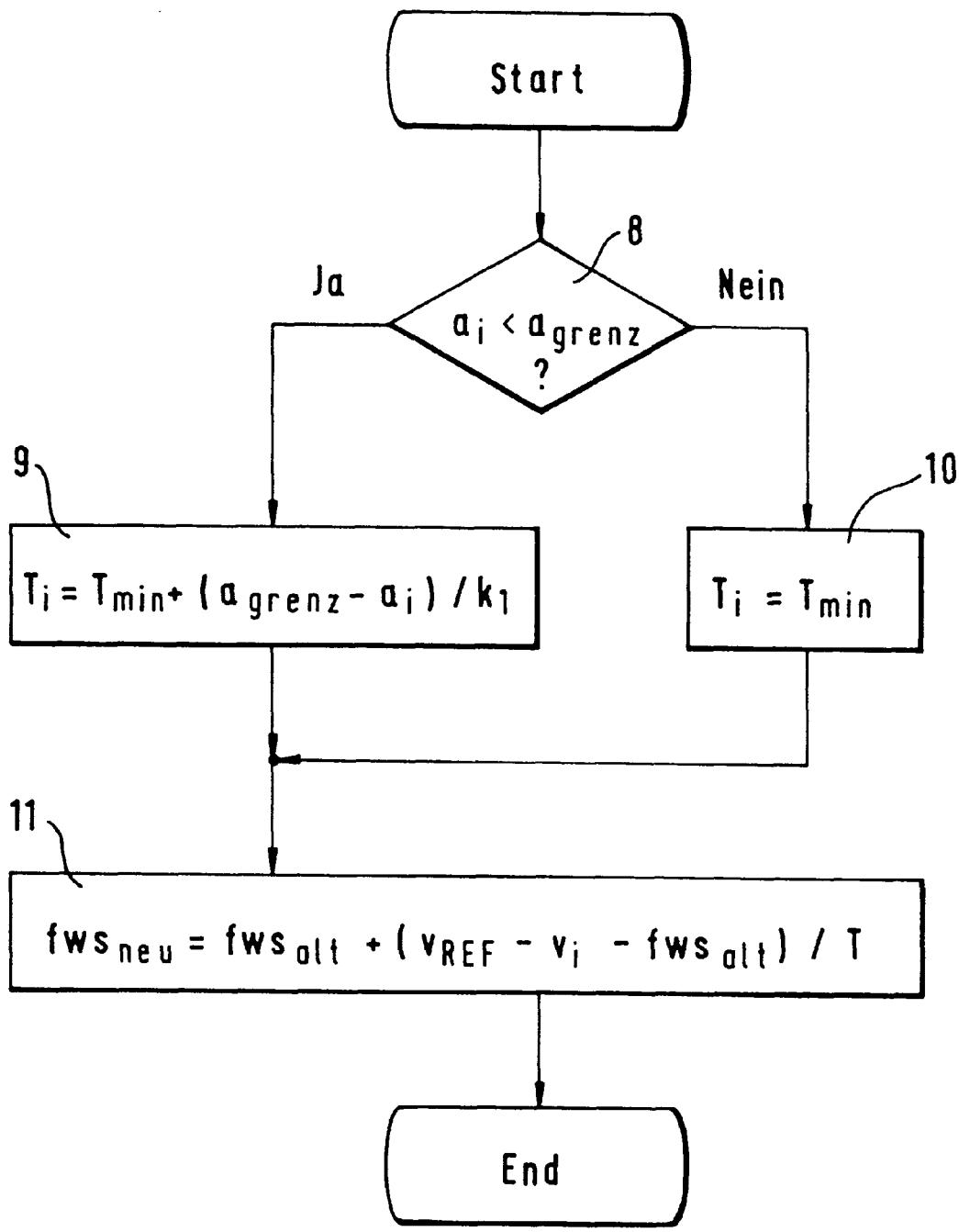
FIG. 2 is a flow chart showing the individual steps of a subprogram used to implement the method of the present invention.

FIG. 2 shows the sequence of interrogation and decision steps by which the method of the present invention is realized. After the START of the sub-program, it is initially determined in an interrogation step 8 whether the acceleration $a_i$ of the wheel i under review indeed falls below the predetermined acceleration limit value $a_{grenz}$. If this is the case (represented by a block 9), the filter time constant $T_i$ applicable to wheel i is calculated in the previously described fashion according to the relation $$T_i = T_{min} + (a_{grenz} a_i)/k_1 \text{ with } i=1 \ldots 4$$

If, however, the wheel acceleration $a_i$ is equal to or greater than $a_{grenz}$, the NO output of branch 8 will apply. In this case (represented by step 10), the time constant $T_1$ of the low pass or low-pass filter 5 (5.1 to 5.4) according to FIG. 1 will adopt the predetermined minimal value $T_i = T_{min}$.

FIG. 2 illustrates that after the filter time constant $T_i$ has been determined in a calculating operation 11, there follows the calculation of the filtered wheel slip value $fws_{neu}$ according to the mathematical relation $$fws_{neu} = fws_{alt} + (v_{REF} - v_i - fws_{alt})/T \; i=1 \ldots 4,$$

which is an important input and control quantity for the ABS logic 7 (see FIG. 1).

What is claimed is:
1. A method of improving the control behavior of an anti-lock control system of a vehicle with a plurality of wheels, comprising the steps of:
   measuring individual wheel speeds;
   deriving a vehicle reference speed that is used as a reference quantity;
   determining the acceleration of the individual wheels from the rotating behavior of the vehicle wheels;
   determining individual wheel slip by comparing the wheel speeds with the vehicle reference speed;
   obtaining criteria for identifying a cornering situation and the curve direction, by filtering the wheel slip values for identifying cornering by way of a low-pass filter and comparing the filtered values, wherein a filter of first order is used as a low-pass filter, with a time constant which is varied as a function of the acceleration of the respective wheel, wherein the time constant $T_i$ of the low-pass filter, starting from a minimum value $T_{min}$, is increased according to the relation

$$T_i = T_{min} + (a_{grenz} = a_i)/k_1 \text{ with } i = 1 \ldots 4$$

when the acceleration $a_i$ of the respective wheel i drops below a predetermined limit value $a_{grenz}$, wherein the limit value $a_{grenz}$ ranges between −4g and −1g and the minimum value of the time constant $T_{min}$ ranges between 50 msec and 100 msec.

2. Method as claimed in claim 1, wherein a value of approximately −2g is chosen for the limit value $a_{grenz}$ of the acceleration, and a value of approximately 70 msec is chosen for the minimum value of the time constant ($T_{min}$).

3. Method as claimed in claim 1, wherein, by utilization of programmed circuits, the filtered wheel slip values fws are produced for each individual wheel i according to the relation $$fws_{i_{neu}} = fws_{i_{alt}} + (v_{REF} - v_i - fws_{i_{alt}})/T_i \; i=1 \ldots 4,$$

wherein '$fws_{neu}$' refers to the wheel slip value which was last determined in the working cycle, '$fws_{alt}$' refers to the filtered wheel slip value which was previously determined in the working cycle, '$v_{REF}$' refers to the vehicle reference speed, '$v_i$' refers to the wheel speed and '$T_i$' to the time constant.

4. A method of improving the control behavior of an anti-lock control system of a vehicle with a plurality of wheels, comprising the steps of:

measuring individual wheel speeds;

deriving a vehicle reference speed that is used as a reference quantity;

determining the acceleration of the individual wheels from the rotating behavior of the vehicle wheels;

determining individual wheel slip by comparing the wheel speeds with the vehicle reference speed, obtaining criteria for identifying a cornering situation and the curve direction, by filtering the wheel slip values for identifying cornering by way of a low-pass filter and comparing the filtered values, wherein a filter of first order is used as a low-pass filter, with a time constant which is varied as a function of the acceleration of the respective wheel, wherein, by utilization of programmed circuits, the filtered wheel slip values fws are produced for each individual wheel i according to the relation $$fws_{i_{neu}} = fws_{i_{alt}} + (v_{REF} - v_i - fws_{i_{alt}})/T_i \quad i=1 \ldots 4,$$

wherein '$fws_{neu}$' refers to the wheel slip value which was last determined in the working cycle, '$fws_{alt}$' refers to the filtered wheel slip value which was previously determined in the working cycle '$v_{REF}$' refers to the vehicle reference speed '$v_i$' refers to the wheel speed and '$T_i$' to the time constant.

* * * * *